Sept. 8, 1936.  J. A. HART  2,053,993
TIME GOVERNED CONTROL MEANS FOR COMBINATION WITH ELECTRIC SERVICE PLUGS
Filed Dec. 8, 1933
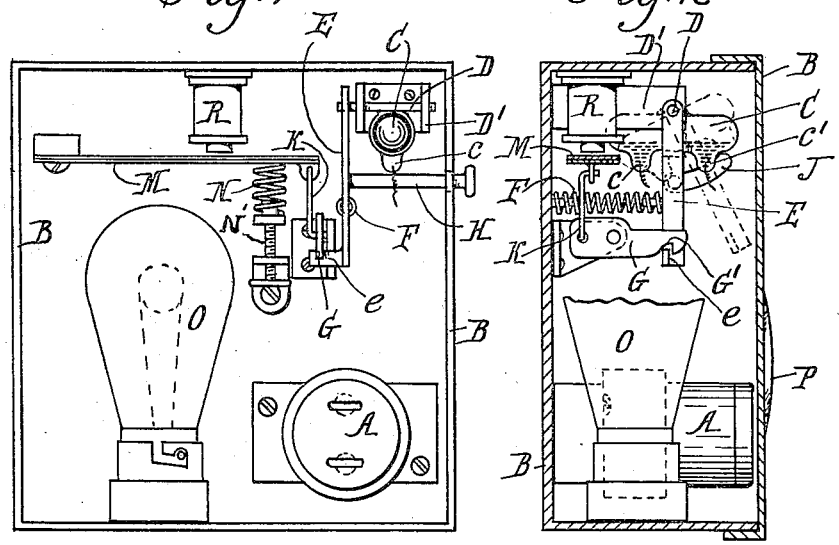
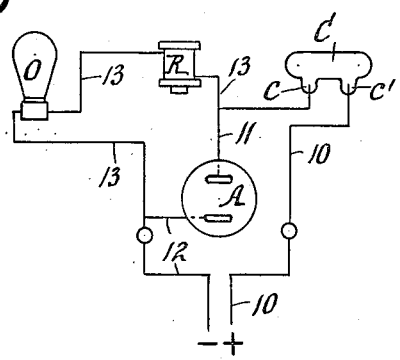
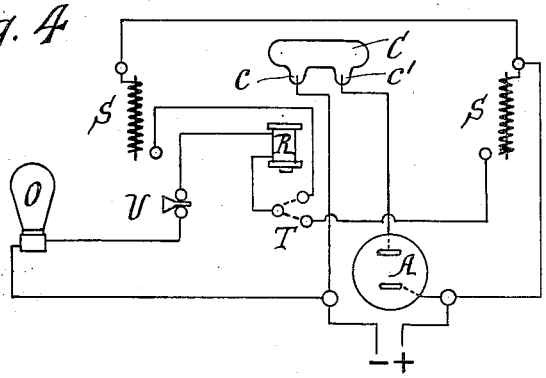
Inventor:
John Ashley Hart
By [signature]
Attorney.

Patented Sept. 8, 1936

2,053,993

UNITED STATES PATENT OFFICE 2,053,993

TIME GOVERNED CONTROL MEANS FOR COMBINATION WITH ELECTRIC SERVICE PLUGS

John Ashley Hart, Auckland, New Zealand

Application December 8, 1933, Serial No. 701,552

2 Claims. (Cl. 200—122)

This invention has been devised with the object of providing means for use in conjunction with the ordinary service wall plug employed in electric installations for the connection of appliances of different kinds with the supply, whereby the current supply to such appliance will be so controlled as to allow of it being established by the manual operation of a switch, and for it being automatically cut off after the lapse of a predetermined period of time.

The invention has more particular application to use in conjunction with the service wall plugs for electric irons, for the purpose of preventing the over-heating of the irons and the consequent liability to cause fire or other damage, should the iron be left unattended with the current supply on.

The means devised provide that the usual current supply to the appliance connected with the plug is effected through a switch apparatus of any approved nature that is capable of being manually closed, but is designed to be opened by the operation of a thermostatic device that is heated by the agency of a heating element, as a lamp, arranged in parallel or shunt circuit with the plug's connections. The said thermostatic device is regulated in its action, to open the switch when heated to a degree determined by its subjection to the action of the heating element for a predetermined period, and such switch also serves to control the current to the said heating element, to cut it off when the current to the plug's service appliance is cut off.

The thermostatic device may, in addition, be controlled in its action by electro-magnetic means arranged in the heating element circuit, in order thus to safeguard against any premature action thereof.

The control switch may be of any approved design, either mechanical or electrical, or a combination of mechanical or electrical in nature. Likewise the heating element may be of any approved nature, but is preferably of ordinary lamp form in order that it may serve the additional purpose of a visual indicator to show whether the current supply is on or off. Also the thermostatic device may be of any approved nature suitable for its combination with the other parts in the special circumstances.

In the accompanying drawing approved means for giving effect to the invention are illustrated. In such drawing:—

Figure 1 is a front elevation of the complete arrangement of apparatus comprising the invention, the container cover being removed.

Figure 2 is an end elevation thereof, partly in section, and looking from the left of Figure 1.

Figure 3 is a diagram illustrating the manner of wiring the apparatus shown in Figures 1 and 2.

Figure 4 is a diagram illustrating an alternative arrangement of apparatus that will be hereinafter more fully described.

In giving effect to the invention according to the manner shown in the drawing, the usual wall service plug A is arranged in combination with a casing B adapted to be fixed to a wall or other fixture. This casing is adapted to contain the whole of the means combining with this plug to constitute the invention.

A tumbler mercury switch C is disposed within the casing and is attached to a rocking spindle D mounted in a frame D' that is affixed to the casing back. A lever arm E is fixed to one end of such spindle and depends therefrom and this by swinging in and out is adapted to tip the mercury switch to cause it, when the arm is in, to cover its two contact points c and c' with the mercury contents, and when the arm is out, to break the mercury connection between them, in the manner well known with this type of switch. The said arm E is pushed out into the latter position by a suitable spring F, and is designed to be held in its inward position by the engagement of a tooth e on its end with a notch G' in the underside of the outer end of a pivoted detent arm G into which the tooth is designed to slip when the arm E is swung inwardly. A rod H is attached to the arm, and extends out through a slot J in the end of the casing to form a finger grip by means of which the arm E may be pushed in, to close the switch, as required in the operation of the device. The lifting of the detent arm G releases the swinging arm, so that it may be moved out by its spring F, to open the mercury switch.

The said detent arm G has its other end connected by the link K with the free end of a bimetallic strip M that extends along within the casing and has its other end made fast to the casing rear. This is designed when in its cold and normal state, to lift the inner end of the detent G and thus to lower the notch end to cause the notch G' to engage and hold the swinging arm E, and when heated, to move down at its free end so as thereby to tip the notch end of the detent upwardly and free the said arm E. A cushion spring N may be arranged beneath this bimetallic strip to prevent it moving down too quickly and to aid in restoring it to the normal raised position, and, in addition, to provide the springy yielding of the detent to enable the tooth of the swinging arm E to slip into the notch of the detent. This spring may be made adjustable in its resistance by arranging it to rest on the upper end of a screw pin N' passing vertically through a bracket on the casing back.

An electric heater element, preferably the lamp O, is disposed in the casing to provide for the heating of the bimetallic strip to obtain the action mentioned. This lamp may also be used as an indicator to show when the current is on and off in the manner hereinafter provided for, and to provide for it so acting, the casing front cover may have a glass disc P (Figure 2) arranged over an opening therein positioned close to the lamp.

There may also be combined with the bimetallic strip, an electro-magnet R disposed in the casing above it, with its pole facing downwardly to contact with the strip when the strip is in its normal position. This magnet is in circuit with the lamp O and, when energized, will act to hold the strip from moving down until its tendency to bend under the heat action of the lamp becomes great enough to overcome the magnetic strength.

The apparatus thus made and assembled may conveniently be sealed in its casing to prevent unauthorized interference. In such a case the face of the plug A is left exposed through the front of the casing and, if desired, the lamp O may be so arranged as to allow of its removal and replacement without unsealing the remainder of the apparatus, in order to allow of a burnt out lamp being replaced.

In the wiring of this apparatus, the course shown in the diagram, Figure 3, is adopted. In this the power lead 10 is carried to one terminal c' of the mercury switch C and then by line 11 from the other terminal c, to one of the contacts of the plug A. The return wire 12 is then carried from the other contact of this plug. When therefore the appliance to be served is plugged into the plug A its current supply is determined by the position of the switch C. A branch wire 13 leads from the wire 11 to the magnet R and through it and the lamp O back to the return wire 12, so that the magnet and its lamp are also dependent for their current supply upon the mercury switch C being in its "closed" position.

Thus with the power supply turned on, and the switch C closed, current will pass to the service plug and also to the magnet and lamp, to cause them to function in the manner desired. When the heat produced by the lamp is great enough to overcome the magnetic force exerted on the thermostat, the switch release mechanism is actuated and the switch C moved to the "open" position, thereby cutting off all current supply. Restoration of the supply is effected by the manual re-closing of the switch C, through the operation of the finger rod H.

Before the said restoration may be effected, however, the thermostat must cool sufficiently to be held by the magnet and as this may entail a lapse of a period of time and the consequent cooling of the appliance served by the plug, it may be desirable to duplicate the thermostatic control device and to arrange the two thermostats in alternative connection so that while one is in action with the service circuit, the other is out of action, and is in a condition to be brought into action when the first one cuts off the current. A diagrammatic arrangement of apparatus suitable in such circumstances is shown in Figure 4 of the drawing.

In this case, the lamp O is used only as an indicator and the switch C controls only the service supply to the plug and its connected appliance. Two combined thermostatic-switch devices S are arranged in parallel circuit with each other and with the plug, through a two way switch T and a common return leading from such switch through the magnet R and lamp O, an "off" push button control U being arranged in the return to break this connection when the appliance is to be put out of action. The two way switch T is manually controlled to bring either device S into circuit operation. Each of these devices is made to provide for it normally closing upon its contacts, and of opening these when it has become heated by the passage of the current through it for a predetermined time. Thus with the switch T in position to close the circuit through one device and such device in its closed position, the current will flow until the period has elapsed, when the device will open and set free the aforesaid mechanism actuating the mercury switch C, to open it. Then on the turning over of the switch T to its other position, the circuit through the other device S (which is in the closed position, being cold or having cooled) is complete so that it is brought into action to, in turn, control the main switch C which has also been re-closed. This change over from one to the other will then continue.

The magnetic coil R in this case being used to hold the switch in the "on" position, on the control circuit being broken by the action of the bimetallic strip in operation, the coil ceases to become a magnet, and the switch is moved from the "on" to the "off" position being thereby pulled by a spring provided.

It will be readily understood that the exact forms of the apparatus employed in giving effect to the invention herein described may be altered in a large number of ways to suit special circumstances and without departing from the principles embodied herein. It is to be understood therefore that the invention is not confined to the use of the particular forms and arrangement of appliances shown in the drawing, as for instance any design of mechanical or electric switch apparatus may be used in place of the mercury switch C; also any form of thermostat retaining and releasing device for such switch, may be employed in place of the bimetallic strip M and its detent G.

The magnetic coil R whether used as a retarding coil to pull the bimetallic strip up, so that the said detent will and can engage and hold the switch in "on" position, and hold it up until its downward bending movement which is great enough to overcome the magnetic pull of the said coil R and so release the switch to the "off" position or used as a holding in coil, simply holding the said switch in the "on" position until its circuit is either shorted or broken by any of the aforesaid or after-mentioned devices shall be connected in series with the pilot lamp or other visual indicating device and any heating device that may be used, so that should any of these or the coil itself break down and become open circuited, the said switch would not remain in the "on" position, and therefore the plug provided could not be made electrically alive until its safety device as described was repaired.

The above gives a distinct advantage over a pilot lamp connected in parallel with the plug terminals, as in this case it is obligatory to the person using the plug to replace the burnt out lamp, it being necessary from an operative point of view to do so.

The device in general is primarily designed for safeguarding the use of electric irons thereby preventing fire through their being left switched on. The single unit type would be set to disengage the supply in about twenty minutes, in which time an iron will reach charring heat, but will not ignite inflammable material. As an iron reaches ironing heat in from seven to ten minutes the device would be switched off and allowed to cool down, and so the twenty minute period would not be reached under ordinary operating conditions, but should the operator forget to switch off, it would switch off itself in twenty minutes from the time it was switched on.

The dual unit type shown in Fig. 4 will give continuous current at the plug with the small effort on behalf of the operator of pressing the "on" button when the visual indicator shows that the plug is electrically dead. The time arranged for the device to operate in this case being about ten minutes, but should the operator forget to press the "off" push button the device would switch itself off in the said ten minutes from the time it was last switched on, and would not switch on again until someone pressed the "on" button.

I claim:—

1. In a device of the character described having a plug receptacle, a switch arranged in series with said receptacle, a luminous heating element shunted across said receptacle, and a bi-metallic thermo-responsive strip, the combination of means for actuating said switch, resilient means tending to shift said switch-actuating means to open the switch, a pivoted lever having means on one end for engaging and retaining said switch-actuating means in a position to maintain the switch closed, and a link connecting the other end of said lever with said thermo-responsive strip for releasing said switch-actuating means upon heating of said strip.

2. In a device of the character described, a casing, a plug receptacle mounted in said casing, a switch mounted in said casing and connected in series with said receptacle, a luminous heating and indicating element mounted within said casing and directly shunted across said receptacle, said casing having a wall provided with a window for display of said luminous element, means for actuating said switch, a spring for urging said actuating means to a position to open said switch, a lever pivotally supported in said casing and having one end notched to engage and retain said switch-actuating means in a position to close the switch, a thermostat positioned above said luminous element, and a link connecting said thermostat to the other end of said lever for shifting said lever to release the switch-actuating means upon heating of the thermostat to a predetermined temperature.

JOHN ASHLEY HART.